Aug. 17, 1965     G. J. BROWN ETAL     3,201,735
ELECTRICAL PRESSURE TRANSDUCER
Filed July 20, 1961     3 Sheets-Sheet 1
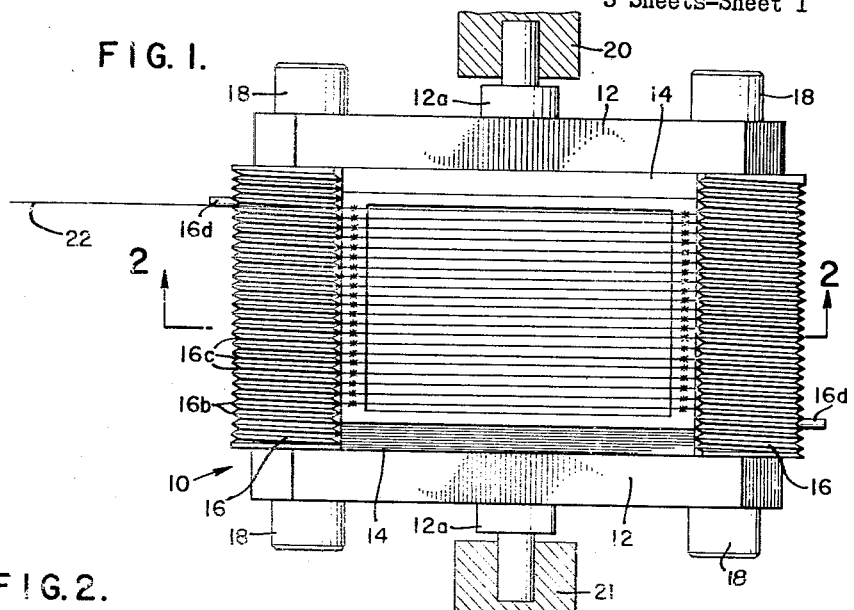
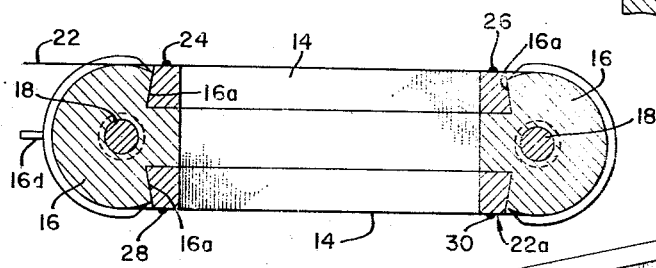
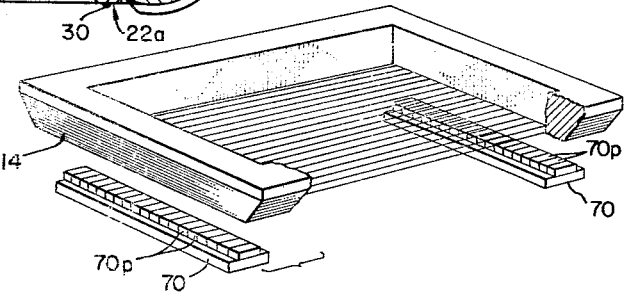
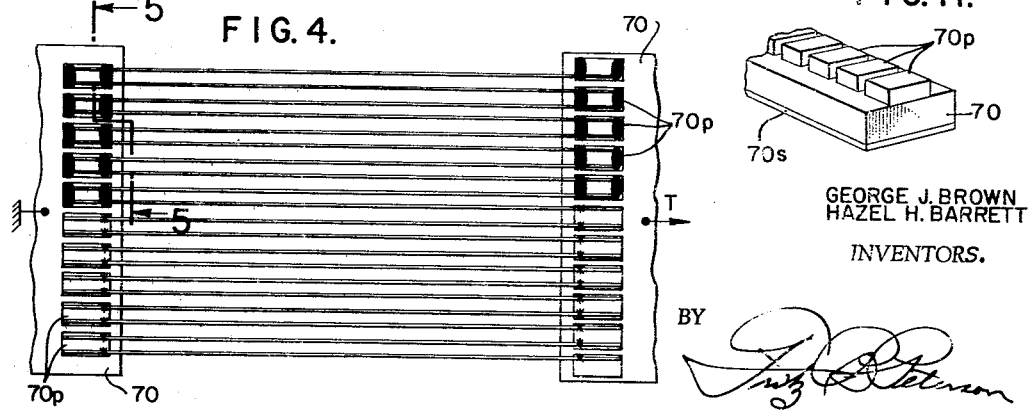
GEORGE J. BROWN
HAZEL H. BARRETT
INVENTORS.
BY

GEORGE J. BROWN
HAZEL H. BARRETT
INVENTORS.

BY

Aug. 17, 1965   G. J. BROWN ETAL   3,201,735
ELECTRICAL PRESSURE TRANSDUCER
Filed July 20, 1961   3 Sheets-Sheet 3

GEORGE J. BROWN
HAZEL H. BARRETT
INVENTORS.

BY

United States Patent Office 3,201,735
Patented Aug. 17, 1965

3,201,735
ELECTRICAL PRESSURE TRANSDUCER
George J. Brown and Hazel H. Barrett, both of Riverside, Calif., assignors to Bourns, Inc., a corporation
Filed July 20, 1961, Ser. No. 125,542
12 Claims. (Cl. 338—6)

This invention pertains to force-sensor means and methods of constructing force-sensor devices and instruments; and more particularly the invention is concerned with a novel method of producing force-sensitive means of the non-bonded "strain gage" type and devices and instruments comprising a novel strain-sensitive element produced according to the method. For illustrative purposes only, the invention will be depicted and described in part in conjunction with a pressure-sensor or so-called "pressure transducer"; but it will be understood that in certain respects the invention is applicable to a wide range of types of instruments by means of which an electrical indication of the magnitude of a force may be obtained.

The prior art comprises a large array of force and/or displacement indicating instruments in which a strain-sensitive wire extends in a plurality of reaches or wraps around two or more spaced-apart pins or supports with its ends insulated one relative to the other and connected to respective electrical terminals. One of the pins is usually fixed, as to a stationary portion of the instrument, and another pin is connected to a movable member that is displaced under the influence of the applied force or displacement whose magnitude it is desired to determine or have indicated. Thus incident to displacement of the movable member the reaches of the wire are subjected to strain-change to an extent proportional to the displacement. The electrical resistance exhibited between the end-connections of the wire varies in accord with the strain, and thus the wire may perform as a variable resistance in an electrical bridge circuit. In many of the prior art instruments there are utilized two (or four) sets of pins or posts and two (or four) multiple loop strain wires, the arrangement being such that as force is applied the tension (and strain) in one wire (or one pair) increases while the tension in the other wire (or pair) decreases, and vice versa; and the two (or four) wires form variable elements in respective limbs of a four-limb bridge circuit. If two wires are used the bridge is called "half-active"; and if four wires are used the bridge is termed "fully-active." In other instruments the arrangement is such that all the wire or wires are stressed the same, that is, the tension is increased in all wires concurrently, and likewise decreased in all the wires concurrently. The wire size, input voltage, length of wire, and resistivity, are determined by the current-carrying limitations, as is understood in the art.

In the instruments described generally in the preceding paragraph, a plurality of reaches or loops of wire are utilized, whereby to provide an amplification or multiplication of the resistance-change effect that is produced in but a single length or reach of the wire, it being evident that the several reaches are in series in the electrical sense but are arranged in substantially parallel relationship mechanically. Thus each of the reaches of the strain-sensitive wire adds its resistance-change effect to those of the other like reaches. The wires are wrapped around the respective sets of posts under tension, whereby a decrease in an applied force or displacement may be indicated as well as can an increase in the force or displacement. For the instrument to be most accurate it is necessary that the several reaches of each wire be under the same tension, which dictates that the wires be wound around their respective sets of posts or supports in situ. Also, it is desirable that the tension be alike in each of any number of like instruments of the same model, and that the tension be of predeterminable magnitude. Due to space limitations, proximity of other parts of the instrument, etc., it is very difficult to wind the wire in place in the instrument with the desired degree of uniformity of tension in a given instrument, and it is extremely difficult to thus wind in situ the reaches of wire in different instruments to approximately the same tension.

The invention here disclosed provides a mode and means whereby the wire units of a plurality of instruments may be easily made substantially identical in the charateristics of concern and in which the individual reaches of wire may all be identically tensioned. Also the wires in a particular winding, and in any instrument, may be of substantially exactly the same length and may be precisely parallel with all others therein, whereby improved instrument accuracy is attained. Also the uncertainty of the effects of wrapping wire around posts is eliminated and of the elastic properties of the posts themselves are eliminated. These results and the improved instruments are secured by first winding a desired number of turns of a wire on a demountable device comprising a set of rigid open frames arranged to rotate in unison as a mandrel, under very uniform tension, thereafter securing individual turns of the wire at the respective ends to a part of the frame, and then affixing portions of each turn to respective sets of instrument pads while under tension. Since the winding may thus be performed under ideal circumstances away from the instrument and under precisely controlled tension, any reach of wire in any instrument may have the same tension as any other. Thus a marked improvement in instruments of the noted types is achieved. The several procedures are hereinafter explained in detail in connection with descriptions of preferred exemplary forms of apparatus.

From the preceding brief description it is evident that it is a prime object of the invention to provide improvements in instruments comprising strain-sensitive resistance wire arranged to sense the magnitude of an applied force.

Another object is to provide improvements in methods of producing strain-sensitive force-sensor means.

Another object of the invention is to provide a mode and means for facilitating manufacture and assembly of force-sensor instruments.

The preceding objects, and other objects that are hereinafter made evident in the appended claims and in the following description, are attained by the invention as illustrated and explained in exemplary form and manner in the description and accompanying drawings, in which drawings:

FIGURE 1 is a plan view of a demountable assembly or winding device, with reaches or turns of strain-sensitive wire wound thereon;

FIGURE 2 is a view in section taken as indicated by line 2—2 of FIGURE 1 and illustrating in addition the spot-welding or soldering of reaches of strain-sensitive wire to assembled frames or harps;

FIGURE 3 is a view of a dismounted harp containing a plurality of reaches of strain-sensitive wire disposed over a pair of terminal supports preparatory to affixing wires to terminals on the supports;

FIGURE 4 is a plan view illustrating in detail the attachment of reaches of wire to terminals or posts affixed to supports and indicating the disposition of elements for electrical series-connection of the reaches of wire;

FIGURE 5 is a fragmentary view in elevation and partly in section as indicated by lines 5—5 of FIGURE 4;

FIGURE 11 is a magnified view of a fragment of an adhesive backed insulated ceramic wafer, with conductive wire-anchoring pads thereon.

Figure 6:
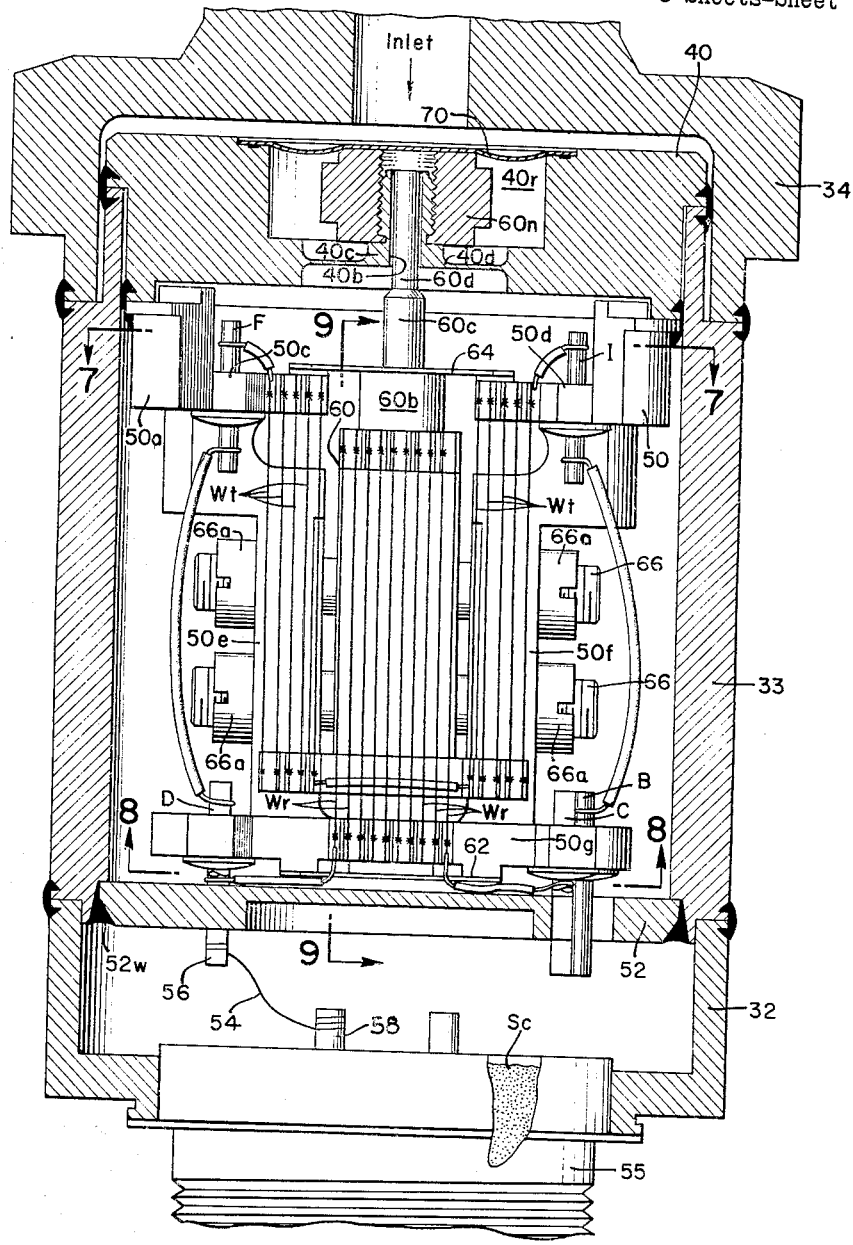
FIGURE 6 is a sectional view through a pressure-sensitive instrument, illustrating a balanced arrangement of strain-sensitive elements constructed in accord with the principles of the invention.

Referring first to FIGURES 1 and 2, there is illustrated a preferred form of device upon which strain sensitive wire is wound under uniform tension. The device, indicated generally by ordinal 10, comprises a pair of opposed sidebars 12, 12, each provided with a gudgeon 12a. Supported between the sidebars 12 are first and second open-center rectangular frames 14, 14, that are disposed at their ends in complementary notches 16a formed along inner faces of first and second opposed spools 16, 16. Spools 16 are firmly secured to respective ends of sidebars 12 by means of capscrews 18, 18, which extend through apertures formed in the end portions of the sidebars and into tapped bores formed in the spools, as indicated in FIGURE 2. The device is assembled by mounting the frames 14 in notches 16a in the spools, and applying the sidebars 12 and capscrews 18 while holding the spools pressed toward each other, as may be evident. The assembled device is rigid and accordingly may be mounted by its gudgeons 12a in a rotary winder and thereby rotated during winding-on of a length of wire. To insure accurate spacing of turns or reaches of wire the spools 16 are provided on their exposed exterior surfaces with threading comprising alternate lands 16b and grooves 16c (FIGURE 1) that may be remnants of an ordinary screw thread formed on the spools prior to formation of the notches 16a. Other details of the device are made evident by examination of FIGURES 1, 2, and 3 of the drawings. With the winding device mounted in a rotary winder (represented symbolically by bearings 20, 21 in FIGURE 1) an end of a length of suitable strain-sensitive wire 22 is suitably secured to one of the spools as at a protruding anchor pin 16d, and the device is rotated while wire is supplied under constant tension and tranversed across the device in correlation with the rotation. Thus a continuous winding of wire is applied to or on the device, and upon conclusion of the winding the wire is secured at another anchor pin 16d to one of the spools and severed between that point and the source of supply (not shown).

From the preceding paragraph it is evident that at this stage of the procedure there are stretched across each of frames 14 a plurality of reaches of wire 22, all under the same tension. The device 10 is then removed from the winding machine, and each of the several reaches of wire is secured at two points to the adjacent one of frames 14, 14, by suitable techniques such as by spot welding or soldering. The mode of attachment is illustrated in FIGURE 2, wherein a reach of wire 22 is secured to upper frame 14 at spot welds 24 and 26, and another reach is secured to lower frame 14 at welds 28 and 30. Preferably, care is exercised to form the welds at precisely spaced points. Thereafter the wire is severed between each of the spot welds and the adjacent part of a spool 16, for example at a location indicated at 22a at the lower right of FIGURE 2. The wire may be thus severed adjacent each weld by passing a sharp blade along the boundary between a frame 14 and a spool 16, as is evident. Following severance of the wire as noted, screws 18 are loosened or removed and frames 14 are removed from the jig or fixture, care being exercised that the reaches of wire (now individual wires) are not disturbed. At this stage of the process each frame has secured thereto at each end limb thereof a plurality of wires each under the same tension. As is evident, the magnitude of the tension is that value selected and used during the winding procedure. The frames are used in positioning and application of wire elements in instruments of the class previously mentioned, as will be later herein made clearly evident.

Figure 7:
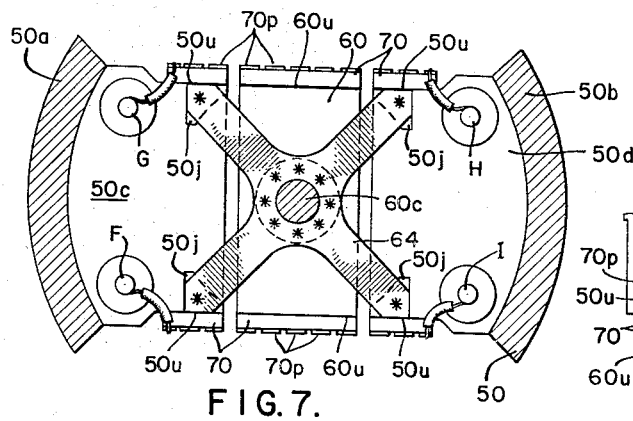
FIGURE 7 is a transverse view of portions of the instrument illustrated in FIGURE 6, viewed as indicated by line 7—7 of FIGURE 6.

In FIGURES 6 through 10 there is depicted a novel exemplary instrument comprising strain-sensitive wire elements produced according to the invention. The illustrated instrument in a pressure sensor adapted to provide an electrical indication of the magnitude of the pressure in a contained fluid. As indicated in FIGURE 6, the instrument comprises a generally cylindrical casing composed principally of casing sections 32, 33, and 34 that during assembly of the instrument may be welded together as indicated to provide hermetically sealed structural junctures. Mounted on and in the upper reduced end of casing section 33 is an annular member 40 which fits as indicated within the lower end flange portion of casing member 34 with a small amount of clearance, as indicated. Secured to an supported by the lower peripheral flange of member 40 is a hanging frame 50, which as indicated is welded to member 40. As indicated in FIGURE 7, frame 50 comprises first and second arcuate flange portions 50a, 50b integral with respective inwardly-extending support wings 50c, 50d; and as indicated in FIGURE 6, frame 50 comprises downwardly-extending spaced columns 50e, 50f integral with respective ones of the wings and each integrally connected at its lower end to a plate 50g (FIGURE 8) that forms the lower end portion of frame 50. Thus the frame is supported at its upper end in the casing, and when in the attitude illustrated is suspended therein by welds produced along flange portions 50a and 50b.

Mounted in the lower interior of casing section 33 is a header 52 formed as a circular plate that is attached to section 33 as by a peripherally-extending weld indicated at 52w. Header 52 is arranged to support a plurality of insulated terminal posts, and has its interior face spaced from the lower face of frame plate 50g, as indicated. Conductors, such as 54, are adapted to connect respective terminal posts, such as 56, to appropriate members of a terminal plug such as 58, in a manner known in the art. It will be understood that terminals such as 56 are insulated and mounted in apertures formed in header 52, also in a manner and by means known in the art. The lower end of the casing is closed by a conventional quick-disconnect type of connector, 55, which is hermetically sealed as by a compound Sc and through which connector the electrical connections extend. Thus the interior of the casing is hermetically sealed.

Figure 8:
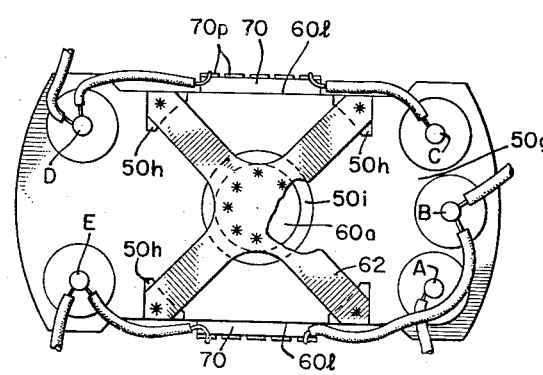
FIGURE 8 is a view similar to FIGURE 7, but with parts of the instruments viewed as indicated by line 8—8 of FIGURE 6.
Figure 9:
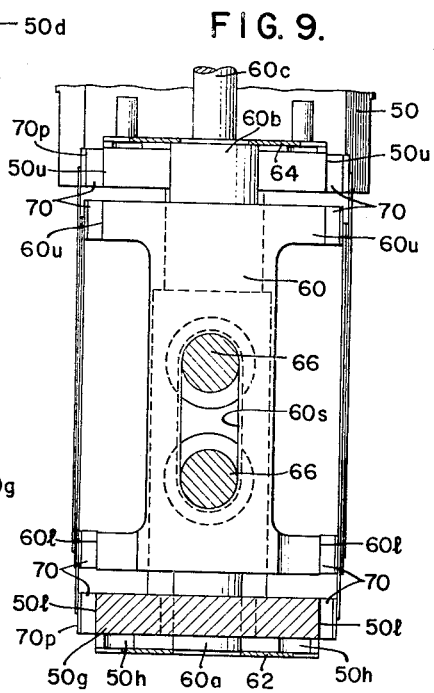
FIGURE 9 is a view of parts of the instrument illustrated in FIGURE 6, viewed as indicated by line 9—9 of FIGURE 6.

Mounted for limited longitudinal linear translation between columns 50e and 50f of the frame 50 is an elongate armature 60 (FIGURES 6 and 9) which at its one (lower as shown) end has a cylindric extension 60a and at its upper end a series of cylindric portions 60b, 60c, and 60d of successively reduced diameter. The armature is yieldingly constrained at its lower end upon a resilient cruciform spring 62 (FIGURE 8) to which its lower cylindric end 60a is attached by spot welding as indicated; the arms of spring 62 being in turn secured at their outer extremities to the bottom faces of respective protrusions 50h formed on the bottom of frame 50, as indicated. As depicted in FIGURE 8, the base 50g of frame 50 is provided with a bore or aperture 50i through which the lower cylindric portion 60a of the armature extends, whereby the latter may be secured or restrained by spring 62 as described. The armature 60 is similarly supported against lateral motion at the upper end of portion 60b by attachment (by spot welding) to an upper resilient cruciform spring 64 whose arms are in turn secured by spot welding to respective pedestals 50j (FIGURE 7) formed on the upper faces of wings 50c and 50d of frame 50. While two cruciform springs are shown it will hereinafter be made apparent that only one may suffice. Spring 64 has a central aperture through which upper cylindric portion 60c of the armature extends. Thus the armature is supported for limited up-and-down movement within the frame. The extent of such movement is limited, in this exemplary instrument according to the invention, by upper and lower through-pins 66, 66 (FIGURES 6 and 9) which are mounted in appropriate bores formed in the columns of frame 50 and secured therein and thereto by nuts 66a (FIGURE 6). The through-pins 66 extend through an elongate slot-like aperture 60s formed transversely through the armature 50 as indicated in FIGURE 9, the slot and disposition of the through-pins being such that a predetermined and limited translation of the armature relative to the frame is permitted. Obviously the actual extent of permitted translation depends upon design factors, and may vary depending upon the use to which the instrument is to be put and other factors.

As indicated in FIGURE 6, the upper cylindric portion 60d of the armature extends through a bore 40b formed in an externally threaded central boss 40c forming an integral part of annular member 40, and terminates flush with the upper face of a nut 60n that is turned on boss 40c as indicated. Nut 60n is disposed in a generally cylindrical recess 40r formed in the upper face of member 40, and the nut and upper end face of portion 60d of the armature are secured as by spot welding to a strong flexible metal membrane 70 whose periphery is hermetically sealed to member 40 by welding. Preferably the outer portion of membrane 70 resides in a shelf-like recess formed in member 40 as indicated. Boss 40c is integral with and connected to the main body of member 40 by a thin annular portion 40d whose diametral dimensions and thickness are calculated according to the range and magnitude of forces to be indicated by the instrument; and similarly, the effective diameter of membrane 70 may be varied to suit the use to which the instrument is to be put, the recess 40r being formed to accord with the diameter of the membrane.

As may be determined by examination of FIGURES 7 and 9, the frame and the armature are provided with sets of substantially coplanar surfaces, one set at the front face of the instrument (as seen in elevation in FIGURE 6) and a similar set at the back face, each set comprising upper surfaces 50u provided by or upon wings 50c, 50d of the frame and an upper surface 60u on a wing-like extension of armature 60, and lower surfaces 50l provided on the bottom bridge portion 50g of the frame and a lower surface 60l on a wing-like lower extension of armature 60. The front set of surfaces are shown in elevation in FIGURE 6, and at the left in FIGURE 9. The rear set of surfaces are indicated at the right in FIGURE 9. Each of the described surfaces, such as 50u, 60u, 50l and 60l, has secured thereto (as by means of adhesive material) a thin electrically insulative sheet or wafer such as is illustrated (in fragmentary form in the interest of clarity) in FIGURE 11. The wafer, 70, may be of appropriate dimensions depending upon the design of the instrument, and may be of suitable insulation such as a high-temperature ceramic material, for example, of alumina. Each wafer is provided along its length with a plurality of electrically conductive pads or anchors such as 70p which form electric terminals for wires and so are spaced-apart and thus are electrically insulated each from the others. Also, in a preferred form, the wafers are initially prepared with a back layer or coat of high-temperature solder or brazing alloy, indicated in FIGURES 5 and 11 at 70s, which solder or alloy forms the mentioned adhesive for securing the wafers to frame, or to the armature. The pads may be applied to a sheet of wafer material as individual deposits applied through apertures of a mask used in a vacuum electrodeposition process, or may be produced from a continuous applied layer of conductive material by grinding-off of portions of the conductor along spaced lines, or they may be produced by other known procedures. Similarly the back-layer or film of adhesive alloy or solder may be applied to the wafer material by known techniques such as by electroplating or vapor-deposition in vacuo, and a sheet divided into individual wafers.

With the insulative wafers secured to respective ones of the coplanar surfaces and the armature and instrument frame structures assembled, strain-sensitive wires affixed to a frame 14 as previously described and as illustrated in FIGURES 2 and 3, are carefully juxtaposed over a pair of wafers on respective upper and lower surfaces, e.g., a wafer on an upper surface 50u of the instrument frame and a wafer on a lower surface 60l on the armature 60, with the individual wires related to individual conductive terminal pads as indicated in FIGURES 4 and 6, and end portions of the wires are carefully welded to pads as indicated by the "X" marks in the lower half of FIGURE 4. Thereafter the wires are severed adjacent the inner edge of frame 14, along a line defined by the outer ends of the pads, and the frame 14 then removed. Thus the several wires of a group thus produced are electrically connected in series by the conductive pads, as indicated in FIGURE 4. From the latter figure it may be noted that, commencing at the upper right there is provided a series circuit that terminates at the lower right of the figure. To improve the electrical conductivity, further secure the wires to the pads, and to precisely define the strain-boundary of the wire elements, solder is preferably applied to the pads and wires at least at the inner ends of the pads, but preferably at both the inner and outer ends of the pads as indicated in the upper portion of FIGURE 4, or over the entire surface of the individual pads. Importantly, the application of the solder defines the boundary of strain-change induced in the wires incident to increase or decrease of the tension thereon; hence it is important that the solder be applied at the inner end boundaries of the respective pads, as a minimum. Application of solder over the entire surface of a pad is also especially desirable in cases wherein the instrument is to be used in high-temperature environments.

Figure 10:
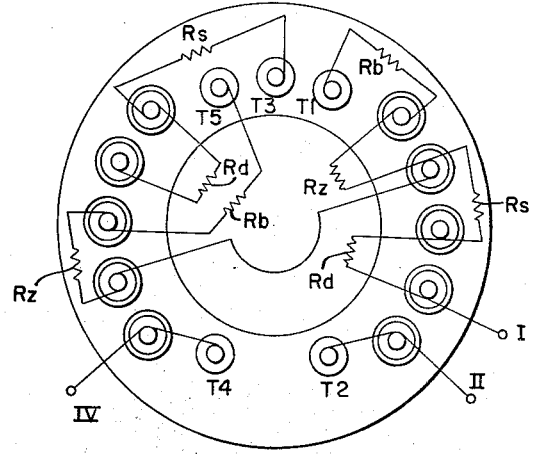
FIGURE 10 is a diagram indicating the physical electrical connection of the electrical elements of the instrument depicted in section in FIGURE 6.
Figure 12:
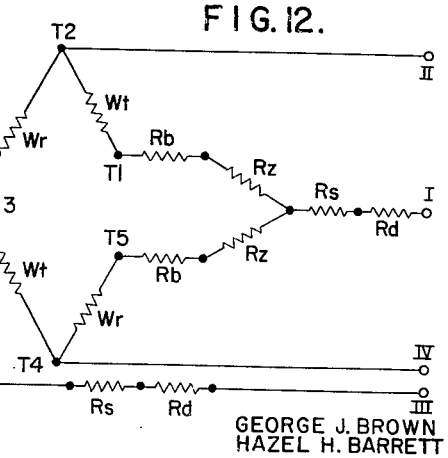
FIGURE 12 is a circuit schematic illustrating the electrical components in a bridge configuration, compatible with the connections illustrated in the other figures.

It is evident that in the exemplary pressure-sensor instrument illustrated in FIGURES 6–10, the procedure detailed in the preceding paragraph is performed for each pair of vertically-aligned wafers, that is, for each of the two outer pairs and the inner or middle pair at the front face of the instrument, and for each of the two outer pairs and the inner or middle pair at the rear face of the instrument. With the several sets of wires (six sets in the illustrated instrument) applied and secured in place, electrical connections are made, as indicated in FIGURES 6, 7, 8 and 10, between terminal pads of sets of wires and between pads and insulated terminal posts mounted in the instrument frame and in header plate 52. While such connections may be made as may be desired for a particular type of functional operation of the instrument, an exemplary concatenation is illustrated in FIGURES 10 and 12. FIGURE 12 is a wiring diagram and FIGURE 10 is a view showing a terminal arrangement on the header of the instrument casing. As indicated in FIGURE 6, when fluid under pressure is admitted into the space or cavity above diaphragm 70, springs 62 and 64 flex downwardly. That action subjects the wires or elements of the outermost sets thereof, indicated by Wt, to an increase of tensile stress, and relaxes to some extent the tension in the wires (labeled Wr) of the middle set.

It is evident that the same actions occur in the rearmost sets of wires, not shown in FIGURE 6. Also, it is evident that release of fluid under pressure from the inlet end of the instrument permits the springs and diaphragm to reversely affect the tensions in the several sets of wires.

In FIGURE 12, balancing resistors R$b$, zero compensating resistors R$z$, sensitivity compensating resistors R$s$, and potential dropping resistors R$d$ are illustrated in the interest of competeness, the functions thereof being well understood by those skilled in the art. The bridge resistances constituted by the strain-sensitive wires or elements are labeled W$t$ and W$r$ to correspond with FIGURE 6.

It is evident from the preceding description that by winding under constant, i.e. uniform, tension enough loops of wire on a single frame 12 to provide all of the wires of all sets of wires in an instrument, greatly increased uniformity in wire tension may be attained, as contrasted to the lack of uniformity resulting from winding in situ a plurality of loops of wire over or around each of several sets of pins or "posts" in an instrument. Also since the winding devices 10 may be made in numbers and substantially identical and wire wound on the frames under substantially identical tension, it is evident that the similar sets of wires in different instruments may be alike in force-sensitivity. Further, the winding of the wire is made simple and easy to perform. Additionally it is noted that by applying solder or otherwise securing each wire to a conductive pad at the edge-boundary of the pad, as described in connection with FIGURE 4, the strain-sensitive portions of the wire may all be of substantially identical length, which is a distinct improvement over unbonded strain-sensitive wires that are wrapped around a circular post or pin and which may accordingly during extension and contraction partake of of variable amounts of slipping and sliding around the semi-circumference of the post and which thus are characterized by an unpredictable error. Further, since there are no outstanding posts or cantilever structures supporting and deflected by the wires, that source of variation in measure is eliminated. Thus the aforestated objects and those defined in the claims are accomplished.

In the light of the disclosure herein of an exemplary physical apparatus and method according to the invention it is evident that changes and modifications will be suggested to those skilled in the art, and accordingly we do not wish to be limited to the exact details of the exemplary mode and apparatus described, but we claim:

1. A displacement-sensing instrument comprising:
   first means, comprising relatively fixed frame means;
   a plurality of insulated discrete electrically-conductive terminal devices fixedly supported by said frame means;
   second means, comprising movable armature means and a displacement-transmitting means constructed and arranged to transmit to said armature a displacement to be sensed by the instrument, and means supporting the armature means for rectilinear movement relative to said frame under influence of a displacement transmitted by said force-transmitting means;
   a plurality of insulated discrete electrically conductive terminal devices secured to move with said armature;
   a plurality of discrete equally tensioned wires each respectively secured to and electrically connected adjacent one end thereof to a said terminal device secured to move with said armature and secured to and electrically connected adjacent the other end thereof to a said terminal device fixedly supported by said frame means, said wires being thus connected electrically in series and arranged substantially parallel to the line of displacement of said armature, whereby a displacement transmitted by said displacement-transmitting means produces a change in tension and a corresponding change in electrical resistance of the wires indicative of the magnitude of the transmitted translation;
   and electrical connections to terminal ones of said terminal devices.

2. A force-sensing instrument comprising:
   first means, comprising relatively fixed frame means;
   second means, comprising relatively movable armature means constructed and arranged for linear motion relative to said frame means;
   third means, comprising a plurality of straight tensioned strain-sensitive wires and a plurality of insulated electrically conductive anchors therefor on said frame and a plurality of such anchors on said armature, said wires each secured at respective ends thereof to and extending between a said anchor on said frame and an anchor on said armature and extending generally parallel each to the others;
   fourth means, including means for applying a force to be sensed to said armature means whereby to flex said resilient means and alter the tension in said wires to change the electrical resistance thereof to an extent indicative of the magnitude of the applied force;
   and electrical connections connected to said conductive anchors.

3. An instrument according to claim 2, said strain-sensitive wires being arranged in sets, and the wires of each set being electrically connected in series and disposed generally parallel to the direction of the applied force, and the sets of wires being so arranged that as an applied force is increased the tension in the wires of one set is decreased with concurrent increase in the tension in the wires of another set.

4. A force- or displacement-sensing instrument comprising:
   first means, including instrument frame means, the latter providing a set of coplanar surfaces;
   second means, including armature means and means mounting said armature for linear displacement relative to said frame means, said armature means providing a set of surfaces coplanar with the coplanar surfaces of said frame means;
   third means, comprising insulated electrically-conductive pads supported, respectively, on said coplanar surfaces and movable therewith;
   fourth means, comprising sets of equally-tensioned strain-sensitive wires each set of which is anchored at one end to conductive pads on said frame and at the other end to conductive pads on said armature, and terminal connections for the respective sets of said wires;
   and fifth means, comprising displaceable means connected to said armature means and effective when displaced to displace said armature means relative to said frame means.

5. A device for use in producing uniformly-tensioned discrete strain-sensitive wires, said device comprising:
   first means, including first and second spaced-apart members;
   second means, including frame means interposed between said spaced-apart members and providing first and second rigidly interconnected limbs each disposed adjacent a respective one of said spaced-apart members; and
   third means, including sidebar means, constructed and arranged to hold said spaced-apart members rigidly interconnected with said frame means clamped therebetween in position for winding under tension reaches of a tensioned strain-sensitive wire around said first means and across the space between said limbs and substantially in contact with said limbs.

6. A device according to claim 5, said device including a pair of rectangular frames comprised in said frame means, and including a pair of sidebars and fastening means removably fastening ends of the sidebars to respective ones of said spaced-apart members.

7. A displacement sensor, comprising:
   first means, comprising sensor frame means comprising a rigid body providing first and second spaced-apart surfaces;

second means, comprising movable armature means and means supporting the armature means for movement in a determined direction relative to said sensor frame means, said armature means including means providing first and second spaced-apart surfaces substantially aligned in said determined direction with respective ones of said spaced-apart surfaces of said rigid body;

third means, comprising electrically insulative members each fixedly mounted on a respective one of said surfaces and each including a flat electrically conductive member thereon;

fourth means, including a plurality of tensioned substantially parallel elongate strain-sensitive conductors each secured at a first end to a said conductive member supported on said rigid body and secured at the second end to a said conductive member supported on said armature; and fifth means, comprising electrical conductor and terminal means for said strain-sensitive conductors.

8. A sensor as defined by claim 7, in which a plurality of said strain-sensitive conductors are electrically connected in series relation.

9. A sensor as defined by claim 7, in which said surfaces are in a plurality of sets of surfaces each of which sets includes a surface on said armature and a surface on said rigid body, and in which said sets are symmetrically disposed about an axis extending in said determined direction.

10. In a displacement sensor utilizing the strain-sensitive characteristics of an elongate electrical conductor as an indicator of magnitude of displacement, means for accurately defining the strain-sensitive end and electrical termination of an elongate strain-sensitive conductor, said means comprising: a thin insulative wafer having at least one edge; a plurality of discrete deposits of electrically conductive material on said wafer, each deposit having an edge substantially coincident with said one edge of said wafer and extending away from the said edge along the surface of the wafer; and at least one strain-sensitive electrical conductor extending transversely of said edge and fusion-united with a said deposit of electrically conductive material at least at said edge whereby to physically anchor and electrically connect the conductor to the conductive material and to provide a distinct boundary at which change of strain is evidenced incident to change of applied tension in said conductor.

11. The combination according to claim 10, in which said conductor extends across said wafer and is fusion-united with said conductive material from edge to edge of the wafer.

12. An instrument comprising displacement-sensor means, comprising, in combination:

first means, comprising casing means and frame means within and secured to the casing means, said frame means defining an axis and presenting a plurality of surfaces generally parallel to the defined axis;

second means, comprising armature means including an armature arranged for translation in the direction of said axis, and resilient means secured to said armature and to said frame means for constraining the armature against movement transversely of said axis, said second means including means for applying displacement-producing forces to said armature and means for elastically resisting displacement by such forces, and said armature presenting a plurality of surfaces each aligned with and complementary with a respective one of said surfaces presented by said frame means;

third means, comprising a plurality of thin insulative ceramic wafers each mounted fixedly on a respective one of said surfaces and each provided with a boundary-edge, and a plurality of electrically conductive pads each insulated from the others and each affixed to one of said wafers and each having a boundary edge coincident with the boundary edge of the respective wafer;

fourth means, comprising a plurality of sets of strain-sensitive electric wires each substantially parallel to said axis and each secured at one end thereof to one of said pads on a respective wafer affixed to said frame means and secured at the other end thereof to one of said pads on a respective wafer affixed to said armature, all of the wires of any set extending under the same tension between the boundary edge of a wafer on the armature and the boundary edge of a wafer on the frame means and all being electrically connected in series in the set; and fifth means, comprising electrical conductors and terminal means, providing electrical connections to said sets of strain-sensitive electric wires.

References Cited by the Examiner

UNITED STATES PATENTS

| 2,900,613 | 8/59 | Dahl | 338—6 |
| 2,913,693 | 11/59 | Li et al. | 338—6 |
| 2,936,516 | 5/60 | Adair | 29—155.68 |
| 2,991,542 | 7/61 | Edwards | 29—155.68 |
| 2,995,721 | 8/61 | De Giovanni | 328—4 |

RICHARD M. WOOD, *Primary Examiner.*

RAY K. WINDHAM, *Examiner.*